T. H. HUNTER.
METHOD OF PRODUCING MOTION PICTURES.
APPLICATION FILED OCT. 18, 1915.
1,173,521. Patented Feb. 29, 1916.
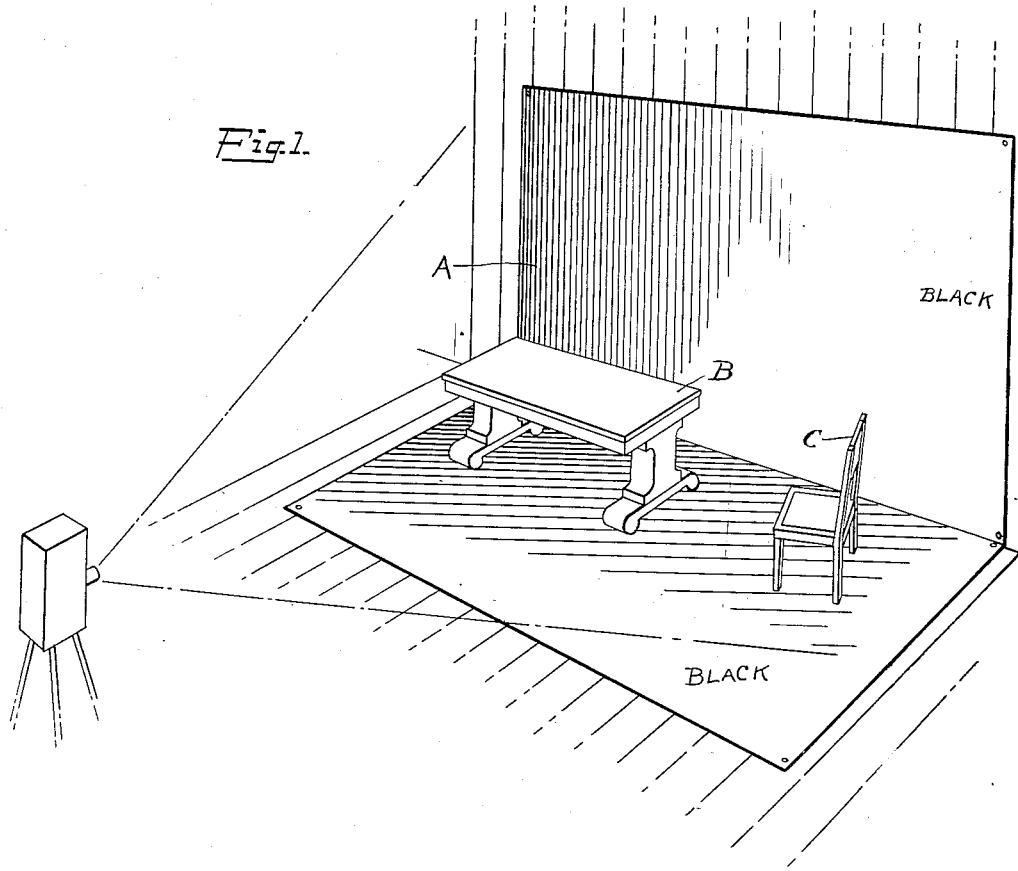
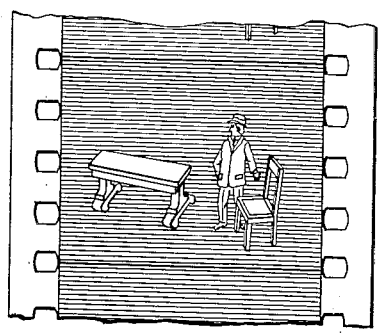
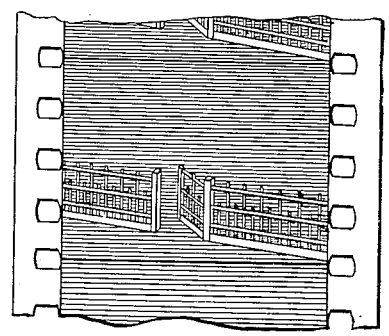
Inventor
Thomas Hayes Hunter
By his Attorneys
Pennie, Davis & Marvin

UNITED STATES PATENT OFFICE.

THOMAS HAYES HUNTER, OF NEW YORK, N. Y.

METHOD OF PRODUCING MOTION-PICTURES.

1,173,521.  Specification of Letters Patent.  Patented Feb. 29, 1916.

Application filed October 18, 1915. Serial No. 56,538.

*To all whom it may concern:*

Be it known that I, THOMAS HAYES HUNTER, a citizen of the United States, and resident of the city, county, and State of New York, have invented certain new and useful Improvements in Methods of Producing Motion-Pictures; and I do hereby declare the following to be a full, clear, and exact description of the invention, such as will enable others skilled in the art to which it appertains to make and use the same.

The invention relates to improvements in the making of motion picture films to get dramatic values not heretofore attained.

Motion pictures of the present day—leaving out of consideration those picture spectacles which depend for their effects upon the scenic value of the successive pictures, either the natural beauty of the scenes or their spectacular staging, and referring only to those in which the values of the situations and actions are truly dramatic—are presented either in connection with complete scenic sets or in connection with real physical surroundings, including all the details of furnishings and objects which customarily obtain in the room or other place where the scene is located.

The present invention is based upon the conception that such stage settings detract from the real dramatic values of the situations and actions of the drama by arousing a secondary and distracting interest in the irrelevant and often elaborate elements or objects of the setting. This distraction is not avoided by simplifying the setting to any degree, however extreme, because such simplification gives rise, in the minds of observers accustomed to complete scenic effects, to a sense of incompleteness of the picture. If the locus of the scene is depicted by any stage setting, the distraction will arise either from the manifold objects of the complete setting or from the absence of the customary furnishings and objects in the incomplete setting.

The novel method of procedure herein disclosed shows the dramatic situations and actions of the story in such manner that the spectators' attention is not diverted by any collateral matter whatever, and new dramatic values are attained.

In the accompanying drawings, I have illustrated an arrangement of apparatus for carrying out my invention and also typical film sections.

Figure 1 shows diagrammatically the manner of setting the stage for taking the film to produce my improved picture; and Figs. 2 and 3 show film sections produced in accordance with my novel method and illustrating an indoor set and an outdoor set respectively.

In procuring the film for my improved picture, instead of setting up in the entire space within the field of the camera the usual furniture and scenery necessary to make the scene, or in the alternative, taking the picture out of doors in a properly selected setting, the pictures are taken within a room or place of which the floor and walls, at least so far as they appear in the field of the camera, are covered with a black covering as shown at A in Fig. 1 of the drawing of a character to absorb the light which may fall upon it, so that, were the film exposed in front of this covering alone nothing whatever would appear on the film. Within the field so prepared the successive incidents of the story are enacted and photographed in the ordinary way. If the location in which the action occurs is a necessary element of the story, as it ordinarily will be, then this locality is indicated with sufficient definiteness by including within the field of the camera, in proper relation to the actors, one or more suggestive articles of furniture or stage "properties", such for example as indicated at B and C in Fig. 1 of the drawing, wherein the action is assumed to take place in a library which is sufficiently indicated by the table and chair of appropriate design. If the incident occurs in an office a single desk will suffice for the purpose; if in a bedroom, a bed or dressing table, whichever may be more appropriate, may be used. In out door scenes a street may be indicated by a lamp post, a building corner, or other "property"; a garden by a gate, a few plants, a tree, or the like. If the locality of the incident is of no significance in the story, the action preferably goes on without "properties" of any kind. When dramatic situations and actions are photographed in such a field, a negative film is produced, the directly printed position of which will, in a projecting machine, throw on the screen a reproduction of the situation or action without background or foreground, as distinguished one from the other, and without a visible floor or other tangible surroundings of the usual realistic picture, the impression conveyed being a complete and striking visualization of the mental picture which would be produced by reading the story of the drama.

Aside from the advantages in the increased dramatic value of the picture, my improved method may be carried out with far less cost than the present methods in which all the details of the scene shown must be included and in which street scenes and other out door scenes must be photographed in the places shown. The saving in the cost of scenery and the labor of setting it up will be apparent, but a saving which is equally important is that of the time of the company in waiting for the scenes to be changed or in being taken from place to place to get suitable surroundings for the incidents of the story.

A further advantage lies in the fact that the entire play is produced at one place and as the change in the properties can at most take but a moment, the scenes may be played in the consecutive order in which they will be shown on the screen. The present method of making films of dramatic stories involves the consecutive enactment and photographing of all those scenes which take place in one location, whether they appear in such order in the story or not; and so with each of the various settings shown at different times throughout the picture. As the action in one scene at a given location may be entirely disconnected from what next occurs at that location by reason of the intervening scenes, it is difficult for the actors in playing the scenes out of their natural order, to express the difference in their relations and emotions which are supposed to have taken place in intervening scenes at other locations. It is also difficult in playing the scenes out of order to have every detail of costume and expression the same in two consecutively displayed scenes at different locations which immediately follow one another in point of time in the story, when several days may necessarily elapse between the actual playing of the scenes. All this is avoided with my novel method. The play can proceed in its proper sequence so that the actors develop the story as the events occur, and as there is substantially no time intervening between the taking of the scenes there is no difficulty in maintaining from one scene to another the proper identity of costume and expression.

In addition to the above enumerated advantages, my improved method produces a picture materially superior from the standpoint of the quality of the projection. The minute gestures and small differences of expression appear much more clearly against the invisible black of the background and the picture has not that appearance of flatness which, due to the absence of stereoscopic effect, is particularly apparent in moving pictures as now taken.

As the picture shows merely the action in the foreground without walls, floor or ceiling, the imagination unconsciously supplies the background as it would appear in viewing the actual scene instead of with the distorted foreshortened appearance of the ordinary moving picture interior.

What I claim is:

1. The method of producing a projected motion picture of a dramatic story which consists in producing a negative by exposing successive portions of a film in a camera having a field whose entire background in the range of the lens is black, a portion of said field including a substantially horizontal base on which the dramatic incidents of the story are acted during the exposure of the film, then producing a positive reproduction of such original film and projecting the pictures of such positive reproduction on a screen which is otherwise not illuminated.

2. The method of producing a projected motion picture of a dramatic story which consists in producing a negative by exposing successive portions of a film in a camera having a field whose entire background in the range of the lens has a black covering, a portion of said field including a substantially horizontal base on which the dramatic incidents of the story are acted during the exposure of the film and on which there are placed suggestive theatrical "properties" to indicate the locality of the individual scenes, then producing a positive reproduction of such original film and projecting the pictures of such positive reproduction on a screen which is otherwise not illuminated.

In testimony whereof I affix my signature.

THOMAS HAYES HUNTER.

It is hereby certified that in Letters Patent No. 1,173,521, granted February 29, 1916, upon the application of Thomas Hayes Hunter, of New York, N. Y., for an improvement in "Methods of Producing Motion-Pictures," errors appear in the printed specification requiring correction as follows: Page 1, line 64, for the word "procuring" read *producing;* same page, line 107, for the word "position" read *positive;* and that the said Letters Patent should be read with these corrections therein that the same may conform to the record of the case in the Patent Office.

Signed and sealed this 28th day of March, A. D., 1916.

[SEAL.]

J. T. NEWTON,

*Acting Commissioner of Patents.*

Cl. 88–16.